No. 772,577. PATENTED OCT. 18, 1904.
J. OERTLY.
INKING ATTACHMENT FOR AUTOMATIC INKING MACHINES.
APPLICATION FILED MAR. 8, 1904.
NO MODEL.
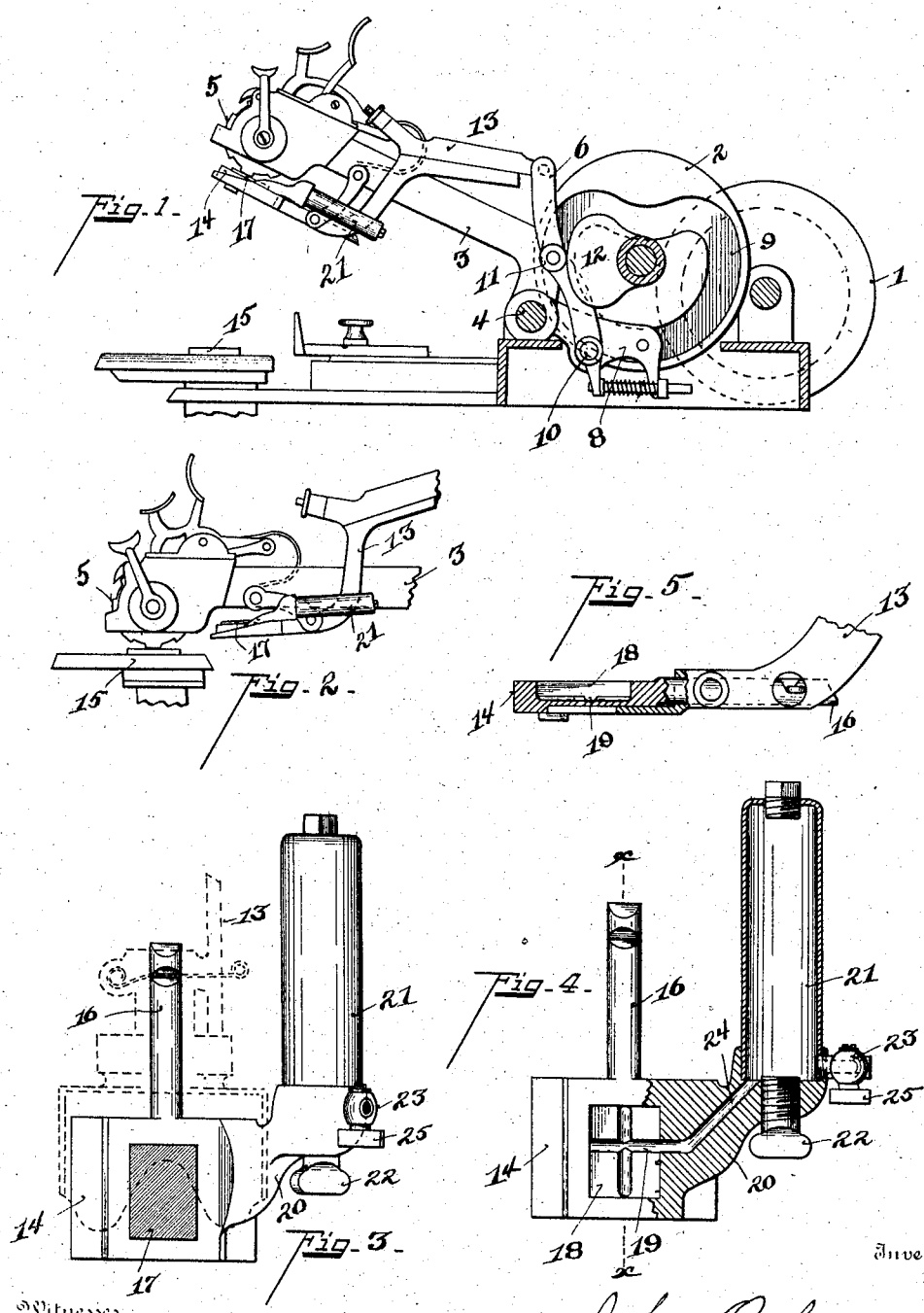

No. 772,577.

Patented October 18, 1904.

UNITED STATES PATENT OFFICE.

JOHN OERTLY, OF CINCINNATI, OHIO, ASSIGNOR TO IRWIN M. KROHN AND S. MARCUS FECHHEIMER, OF CINCINNATI, OHIO.

INKING ATTACHMENT FOR AUTOMATIC INKING-MACHINES.

SPECIFICATION forming part of Letters Patent No. 772,577, dated October 18, 1904.

Application filed March 8, 1904. Serial No. 197,181. (No model.)

*To all whom it may concern:*

Be it known that I, JOHN OERTLY, a citizen of the United States, residing at Cincinnati, in the county of Hamilton and State of Ohio, have invented certain new and useful Improvements in Inking Attachments for Automatic Inking-Machines, of which the following is a specification.

My invention relates to a self-inking attachment for a printing-machine. For convenience I have illustrated my device as applied to the machine substantially shown and described in the patent to J. D. Humphrey and J. French, No. 660,512, October 23, 1900.

The features of my invention are more fully set forth in the description of the accompanying drawings, forming a part of this specification, in which—

Figure 1 is a side elevation, partly in section, illustrating my improvement attached to a printing-machine in the inking position. Fig. 2 is a side view showing a portion of the machine in the printing position. Fig. 3 is a top plan view of my invention. Fig. 4 is a central horizontal section. Fig. 5 is a section on line $x$ $x$, Fig. 4, together with a portion of its supporting-bracket, shown partly in section.

1 represents the driving-wheel; 2, the actuating cam-wheel.

3 represents a stamping-arm fulcrumed at 4 to the frame of the machine. In the outer end of the arm is journaled the type-block 5, with a suitable mechanism for adjusting it.

6 represents a reciprocating inking-arm. The stamping-arm 3 has a crank-arm 8, one end of which works in the cam-groove 9 of the cam 2. One end of the inking-arm 6 is fulcrumed at 10 to the crank-arm 8. Arm 6 has a boss 11, which is actuated by the cam 12, mounted on the shaft of the cam-wheel 2. Without entering into further details of this mechanism it is to be understood that the inking-arm 6 has a bracket-arm 13, carrying the inking device constituting my invention. In the position shown in Fig. 1 the stamping-arm 3 is raised and the inking-pad 17 is held in contact with the printing-disk 5 for inking. When the wheel 1 is rotated, the arm 13 is withdrawn, as shown in Fig. 2, and the stamping-disk is brought against the printing-table 15.

Attached to the bracket-arm 13 is an inking attachment consisting of the stem 16, secured to the said bracket. The stem 16 carries the inking-plate 14. The inking-plate is cut out to form a bed 18 for the inking-pad 17. The said bed 18 is provided with the distributing-ducts 19. The plate 14 is provided with a bracket-arm 20, supporting the inking-tube 21. 22 is a screw-plug for filling the inking-tube. 23 is an air-valve at the mouth of the said tube. 24 is a feed-conduit from the mouth of the tube to the distributing-ducts 19 of the inking-bed. The air-valve 22 has a regulator 25. In the position shown in Fig. 1 the inking-tube is slightly tilted to the horizontal, the mouth being up. The quick reciprocation of the tube in the position shown in Fig. 2, in which the mouth is tilted slightly below the horizontal, constitutes a gravity-feed. During this quick throw the ink is jetted into the ink-distributing ducts of the inking-bed and absorbed by the inking-pad. If the air-valve 22 were closed, an air-cushion would form at the mouth of the tube, preventing the discharge of the ink. By admitting a graduated amount of air the amount of ink to be fed may be controlled. This device is absolutely automatic and clean. It economizes the ink and also the pad. The operator does not have to move the pad for inking, and a supply of ink will last for quite a time. The device is regularly applicable to other devices of this type employing a reciprocating inking-pad.

My improvement is particularly applicable to a self-inking attachment for power upper and lining marking machines. By means of the automatic inker the operator is enabled to stamp uppers or kid-linings without stopping to ink the pad during the day, thus more than doubling the capacity of each machine. The ink being fed automatically, every impression is uniform and clear. The motion of the machine always keeps the ink well mixed and prevents any sediment from settling and clogging the pad or the machine, thereby insuring the very best results. But one impression is required, as the pad furnishes fresh ink for each impression. More than one stroke is a waste of both time and ink.

The attachment prevents all waste of ink, requiring no brush, and being closed the ink cannot evaporate. Owing to its position on the machine, the ink does not feed except when the inker is in motion.

Having described my invention, I claim—

1. In a machine of the character described, a reciprocating inking-bed, an inking-pad thereon, an inking-tube fixed to move with the bed, supported with its mouth normally elevated, and adapted to be partly inverted when the bed is reciprocated to feed the ink by gravity to the pad, substantially as described.

2. In a machine of the class described, an attachment for a reciprocating arm, consisting of an inking-plate, an inking-bed, a pad, an inking-tube carried by the plate with its mouth normally elevated and adapted to be partly inverted when the bed is reciprocated there being a restricted feed-duct formed from the tube to the bed adapted to feed the ink by gravity when the tube is partly inverted, substantially as described.

3. In a machine of the class described, an attachment for a reciprocating arm consisting of an inking-plate having an inking-bed formed therein, an inking-pad to the bed, an ink-tube carried by the plate, a conduit between the bed and tube, and an air-valve in the mouth of the tube, substantially as described.

4. In a machine of the character described, an attachment for a reciprocating arm consisting of an inking-plate having an inking-bed formed therein, ink-distributing ducts formed in the bed, an inking-pad in the bed, the plate having a bracket-arm, an inking-tube supported by the bracket-arm, there being a feed-conduit formed in the bracket-arm between the tube and bed, and an adjustable air-valve in the mouth of the tube, substantially as described.

5. In a machine of the character described, in combination with a stamping-arm carrying a type-block, a reciprocating arm, an inking-pad and an inking-tube supported by the reciprocating arm, with the mouth of the tube normally above the horizontal plane, adapted to be inverted when the arm is reciprocated for feeding ink to the pad, and means for actuating said arms, substantially as described.

6. In a machine of the character described, in combination with a stamping-arm carrying a type-block, a reciprocating arm, adapted to apply an inking-pad to said block, an inking attachment for said reciprocating arm consisting of a plate having an inking-bed formed therein, an inking-pad in the bed, an inking-tube, a conduit between the tube and bed, the said tube being normally supported at an angle to the horizontal and adapted to be inverted when the arm is reciprocated or intermittingly applying ink to the pad, substantially as described.

7. In a machine of the character described, in combination with a stamping-arm carrying a type-block, a reciprocating arm, adapted to apply an inking-pad to said block, an inking attachment for said reciprocating arm consisting of a plate having an inking-bed formed therein, an inking-pad in the bed, distributing-ducts formed in the bed, a conduit between the tube and bed, and an air-valve in the said tube, the said tube being normally supported at an angle to the horizontal and adapted to be inverted when the arm is reciprocated or intermittingly applying ink to the pad, substantially as described.

8. In a machine of the character described, in combination with a stamping-arm carrying a type-block, a reciprocating arm, adapted to apply an inking-pad to said block, an inking attachment for said reciprocating arm consisting of a plate having an inking-bed formed therein, an inking-pad in the bed, distributing-ducts formed in the bed, a bracket-arm carried by the plate, an inking-tube supported by the plate, there being a conduit formed in the bracket-arm between the tube and bed, and an adjustable air-valve at the mouth of the tube, the said tube being normally supported at an angle to the horizontal and adapted to be inverted when the arm is reciprocated or intermittingly applying ink to the pad, substantially as described.

In testimony whereof I have hereunto set my hand.

JOHN OERTLY.

Witnesses:
W. R. WOOD,
IRWIN M. KROHN